(12) United States Patent
Auger et al.

(10) Patent No.: US 8,860,556 B2
(45) Date of Patent: Oct. 14, 2014

(54) METHOD AND SYSTEM FOR THE SECURE DETECTION OF AN RFID ELECTRONIC TAG

(75) Inventors: Marc Auger, Soyaux (FR); Jean-Marie Nebout, Garat (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 226 days.

(21) Appl. No.: 13/613,713

(22) Filed: Sep. 13, 2012

(65) Prior Publication Data

US 2013/0120122 A1  May 16, 2013

(30) Foreign Application Priority Data

Nov. 16, 2011  (FR) ..................................... 11 60403

(51) Int. Cl.
| | |
|---|---|
| *H04Q 5/22* | (2006.01) |
| *G08B 13/14* | (2006.01) |
| *G05B 19/18* | (2006.01) |
| *F16P 3/08* | (2006.01) |

(52) U.S. Cl.
CPC ....................................... *F16P 3/08* (2013.01)
USPC ... 340/10.51; 340/10.1; 340/10.3; 340/572.4; 700/4

(58) Field of Classification Search
USPC ....................... 340/572.1, 572.4, 5.61; 700/4
See application file for complete search history.

(56) References Cited

U.S. PATENT DOCUMENTS

| | | | | |
|---|---|---|---|---|
| 5,887,176 A | * | 3/1999 | Griffith et al. ................ | 713/320 |
| 5,952,935 A | * | 9/1999 | Mejia et al. .................. | 340/10.3 |
| 6,977,576 B2 | * | 12/2005 | Denison et al. .............. | 340/5.73 |
| 7,446,646 B2 | * | 11/2008 | Huomo ........................ | 340/10.1 |
| 8,164,426 B1 | * | 4/2012 | Steinhart et al. ............. | 340/10.4 |
| 2007/0205861 A1 | | 9/2007 | Nair et al. | |
| 2007/0206701 A1 | * | 9/2007 | Paley et al. .................. | 375/295 |
| 2007/0216531 A1 | | 9/2007 | Lee | |
| 2009/0134212 A1 | * | 5/2009 | Chamley et al. ............. | 235/375 |
| 2010/0073145 A1 | | 3/2010 | Lorenz et al. | |
| 2010/0127824 A1 | | 5/2010 | Moschl et al. | |

FOREIGN PATENT DOCUMENTS

| | | |
|---|---|---|
| EP | 2 166 485 A1 | 3/2010 |
| WO | WO 2006/049374 A1 | 5/2006 |

OTHER PUBLICATIONS

French Preliminary Search Report and Written Opinion issued Jul. 2, 2012, in French 1160403, filed Nov. 16, 2011 (with English Translation of Categories of Cited Documents).

* cited by examiner

*Primary Examiner* — Daniel Wu
*Assistant Examiner* — Mohamed Barakat
(74) *Attorney, Agent, or Firm* — Oblon, Spivak, McClelland, Maier & Neustadt, L.L.P.

(57) ABSTRACT

The invention relates to a method and a system for the secure detection of an RFID electronic tag (ET1). This detection system comprises a read/write station (1), said station (1) comprising first processing means (12) and second processing means (13), the first processing means (12) and the second processing means (13) making it possible to read in parallel control data (CD) previously written in the RFID electronic tag (ET1) when the RFID electronic tag (ET1) is located within range of the station. The station controls the state of the machine according to the processing performed.

9 Claims, 1 Drawing Sheet

METHOD AND SYSTEM FOR THE SECURE DETECTION OF AN RFID ELECTRONIC TAG

TECHNICAL FIELD OF THE INVENTION

The present invention relates to a method and a system for the secure detection of an RFID electronic tag. The method and the system make it possible to associate an RFID tag and a read/write station safely and monitor the presence of the tag.

STATE OF THE ART

To secure the access to a machine located in a room, it is known practice to provide a secure detection system which makes it possible to stop the machine when the means of access to the room is opened. Thus, when a person enters into the room, he or she is not exposed to the hazards associated with the operation of the machine. In order to stop the machine when the access means is open, it is known practice to employ magnetic coding sensors. However, this type of solution does not offer all the necessary fraud-proofing guarantees.

To provide a much better level of fraud-proofing, it has therefore been proposed to employ RFID-based detection systems. An RFID electronic tag is thus, for example, fixed to the access means, whereas a read/write station is fixed to the frame of the access means. When the RFID electronic tag is located within the field of the station, this means that the access means is closed and the machine is then allowed to operate. However, this solution presents some drawbacks, notably linked to the time to process the data read in the tag and to the risks of collision with tags present in proximity.

The aim of the invention is therefore to propose a solution which makes it possible to safely, rapidly and robustly detect the presence of an RFID electronic tag.

EXPLANATION OF THE INVENTION

This aim is achieved by a secure detection method implemented in a secure detection system intended to detect the presence of an RFID electronic tag, said system comprising a read/write station, said read/write station comprising an RFID communication interface intended to exchange data with the RFID electronic tag, first processing means connected to the RFID communication interface and second processing means connected to the RFID communication interface, said method comprising:
- a step of storage, by the first processing means and by the second processing means, of a unique identifier of the RFID electronic tag and of storage of control data associated with this unique identifier,
- a writing step controlled by the first processing means for writing the control data in the RFID electronic tag,
- a reading step implemented in parallel by the first processing means and by the second processing means for reading the control data sent by the RFID electronic tag when the RFID electronic tag is located within the field of the read/write station,
- a checking step implemented by the first processing means and the second processing means for performing a check on the control data read against the control data stored during the storage step,
- a step of generation, by the first processing means and by the second processing means, of two output signals taking into account the check performed during the checking step.

According to one particular feature, the method comprises a step of selection and of activation of the RFID electronic tag implemented by the reading and checking, by the first processing means and the second processing means, of the unique identifier stored in the RFID electronic tag.

The invention also relates to a system for the secure detection of an RFID electronic tag storing a unique identifier and control data, the system comprising a read/write station which comprises:
- an RFID communication interface intended to exchange data with the RFID electronic tag,
- first processing means connected to the RFID communication interface and comprising means for storing the unique identifier and control data associated with this unique identifier, means for writing control data (CD) in the RFID electronic tag (ET1) and reading means for reading the control data stored in the electronic tag,
- second processing means connected to the communication interface and comprising means for storing the unique identifier and control data of the electronic tag, and reading means for reading said control data of the RFID electronic tag,
- the first processing means and the second processing means comprising means for checking the control data read against the control data stored in the storage means,
- means for generating output signals, activated by the first processing means and by the second processing means on the basis of the check performed by the checking means.

According to a particular feature, the first processing means and the second processing means comprise means for reading and checking the unique identifier of the RFID electronic tag.

According to another particular feature, the RFID communication interface comprises an antenna.

According to another particular feature, the system comprises a serial bus installed between the RFID communication interface, the first processing means and the second processing means.

According to a variant embodiment, the system comprises a parallel bus installed between the RFID communication interface, the first processing means and the second processing means.

According to another particular feature, the system comprises a communication channel installed between the first processing means and the second processing means.

According to another particular feature, the RFID electronic tag is fixed to an access means to a hazardous area and the read/write station is fixed to the frame of the access means.

BRIEF DESCRIPTION OF THE FIGURES

Other features and advantages will emerge from the following detailed description, given in light of the appended drawings in which.

DETAILED DESCRIPTION OF AT LEAST ONE EMBODIMENT

Figure 2A:
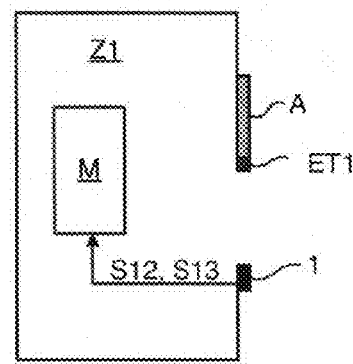
FIGS. 2A and 2B represent the detection system of the invention applied to the detection of the state of an access means to a hazardous area, respectively to the access means open state and to the access means closed state.
Figure 2B:
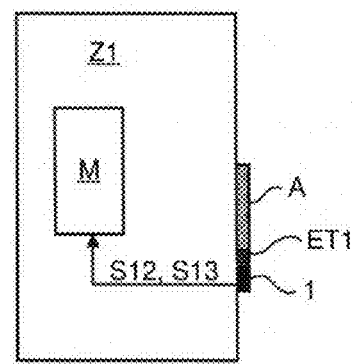

The invention relates to a detection system which can, for example, be employed to secure access to a hazardous area Z1. As represented in FIGS. 2A and 2B, this detection system is, for example, positioned in such a way as to know the state of an access means A to the hazardous area Z1. If a machine M is placed in the hazardous area, the machine must be stopped and not allowed to operate when the access means A is open. The access means A may be sliding, swinging or revolving. To guarantee a high level of fraud-proofing, the detection system of the invention is of RFID type. Furthermore, it comprises a redundancy solution, which makes it possible, for example, to be sure of the state of closure of the access means A of the hazardous area Z1, without risking causing the system to fail.

Hereinafter in the description, the detection system of the invention is described in its application to the monitoring of the state of the access means A to the hazardous area Z1.

According to the invention, the detection system comprises an RFID electronic tag ET1 for example fixed to the access means A and an RFID read/write station 1 fixed to the frame of the access means A. The reverse could also be possible. With a revolving access means, a number of electronic tags could be employed to monitor the open or closed state of the access to the hazardous area.

Hereinafter in the description, we will be focussing on a solution employing a single RFID electronic tag ET1.

The RFID technology is well known. Generally, an RFID read/write station 1 has an antenna formed by an oscillating circuit in which it is possible to create or pick up a magnetic field which allows for wireless communication by magnetic coupling (also called inductive coupling) with any oscillating circuit placed within an area of dialogue of the station, for example with the antenna of an RFID electronic tag. Generally, the binary data are exchanged between a station and an RFID electronic tag by an amplitude and/or phase modulation of the carrier frequency of the magnetic signal.

An RFID electronic tag is thus capable of receiving a radio signal and of returning, in response, a different signal containing relevant information. It has a memory which makes it possible to store a variety of identification, recognition and/or process information, in particular a unique identifier UID. Some tags allow only for a read of data previously stored when a station is placed in proximity, while others additionally allow for a write of data (single or multiple write) which will be stored in the tag.

Moreover, in the case of a so-called passive RFID electronic tag, the electromagnetic signal (carrier) created by the antenna of the RFID station is used to electrically power the tag when the latter is within the area of dialogue of the station. The energy picked up by the antenna of the tag is in fact transformed into electrical energy which powers the internal circuits (memory, processing unit, etc.) of this tag. By being powered with the energy produced by the electromagnetic field of the station, the tag therefore offers the advantage of not requiring internal power supply such as a button cell or a battery.

Figure 1:
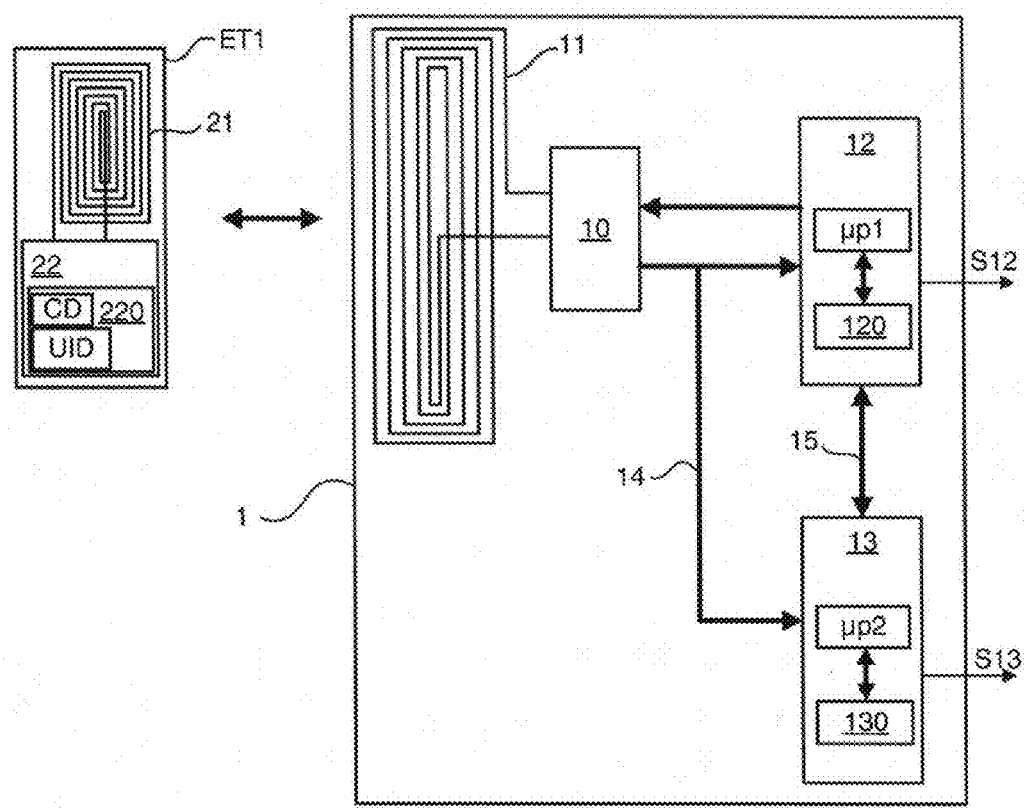
FIG. 1 schematically represents the detection system of the invention.

In FIG. 1, the electronic tag ET1 comprises an antenna 21 and processing means 22, the processing means 22 comprising a memory 220.

Preferably, in the solution of the invention, the RFID electronic tag ET1 is of passive type and operates at a frequency of 13.56 MHz.

With reference to FIG. 1, the detection system of the invention uses a single RFID electronic tag ET1 and the read/write station 1 comprises an RFID communication interface 10 provided with an antenna 11, first processing means 12 and second processing means 13. The first processing means 12 comprise, for example, a first microprocessor µp1 and first storage means 120 and the second processing means 13 comprise a second microprocessor µp2 and second storage means 130.

The RFID communication interface makes it possible to communicate with the RFID electronic tag ET1. It produces the amplitude and/or phase modulation of the carrier frequency of the magnetic signal transmitted by the antenna 11. The first processing means 12 and the second processing means 13 are connected to the RFID communication interface, for example via a serial bus 14, for example of SPI ("Serial Peripheral Interface") type. The first processing means 12 comprise means for generating commands to the RFID electronic tag ET1 and means of reading the responses sent by the RFID electronic tag ET1. The second processing means 13 comprise means for reading the responses sent by the RFID electronic tag ET1.

The system also comprises a communication channel 15 extending between the first processing means 12 and the second processing means 13 and which enables the processing means to communicate with one another and to exchange data. The first processing means 12, the second processing means 13 and the RFID communication interface 10 are synchronized with one another by a clock signal.

The principle of operation of the detection system of the invention is described below.

The RFID electronic tag ET1 fixed to the access means A is firstly learned about by the read/write station 1 in a configuration phase. The first processing means 12 and the second processing means 13 both store in their storage means 120, 130 the unique identifier UID of the RFID electronic tag ET1. During the configuration phase, the first processing means 12 and the second processing means 13 check that they have correctly read the same unique identifier UID by communicating via the communication channel 15. Thus, in normal operation, only the RFID electronic tag ET1 which has been learned about will be addressed. Any other electronic tag situated within the field will not be considered by the station.

During this configuration phase, the first processing means 12 create, for this RFID electronic tag ET1, specific control data CD and send, via the RFID communication interface 10, a command to write these specific control data CD in the RFID electronic tag ET1. It is these specific control data CD which will be read each time by the first processing means 12 and the second processing means 13 when the machine M is in operation. This avoids the need for the first and second processing means 12, 13 to read, each time, the entire unique identifier UID of the RFID electronic tag (which would slow down the processing time).

During the configuration phase, the control data CD written are reread by the first processing means 12 and the second processing means 13 and backed up by the first processing means 12 and the second processing means 13 in their storage means 120, 130, correlated with the unique identifier UID of the RFID electronic tag ET1. The first processing means 12 and the second processing means 13 also check that the control data CD that they have read are identical by communicating via the communication channel 15. The control data CD may consist of a number of bytes and their inverse.

Once the configuration phase is finished, the system is ready to operate normally. Depending on the position of the access means A, the RFID electronic tag ET1 is or is not located within the field of the read/write station 1 and makes it possible to determine whether the machine M has to be kept stopped, kept in operation, allowed to start or stopped. For this, the station generates two output signals, a first output signal S12 generated by the first processing means 12 and a second output signal S13 generated by the second processing means 13. If at least one of the two output signals S12, S13 is in the 0 state, the machine must be stopped or kept stopped. If the two output signals S12, S13 are in the 1 state, the machine is allowed to start or is kept in operation.

According to the invention, three cases of operation can be distinguished:

1) first case of operation: machine stopped and access means A open.

Since the access means A is open, the RFID electronic tag ET1 is not within the field of the read/write station 1. The RFID electronic tag ET1 is not powered by the station 1 and is therefore deactivated. The read/write station 1 tries to detect the RFID electronic tag ET1 previously learned about during the configuration phase by sending requests to read the unique identifier UID of this tag. Since these requests remain unanswered, the read/write station 1 generates the two output signals S12, S13 meaning that the machine M must be kept stopped (FIG. 2A).

2) second case of operation: machine stopped and access means A closed.

The RFID electronic tag ET1 is located within the field of the read/write station 1. If the access means A was previously open, the read/write station 1 must first select the RFID electronic tag ET1 and activate it. For this, the read/write station 1 sends requests to read the unique identifier UID of the RFID electronic tag ET1. The first processing means 12 and the second processing means 13 then check that they have read the same unique identifier UID and that this unique identifier UID does indeed correspond to that stored in their storage means 120, 130. If the unique identifier UID read by the first processing means 12 and the unique identifier UID read by the second processing means 13 are not identical or if the unique identifier UID read by the first processing means or by the second processing means does not correspond to the one stored in their storage means, the read/write station 1 generates the two output signals S12, S13, meaning that the machine must remain stopped.

Once the tag is activated and checked, the station must read the control data CD of the activated RFID electronic tag ET1. The read/write station 1 makes it possible to perform a double read of the RFID electronic tag ET1. For this, the first processing means 12 generate a command to retrieve the control data CD, said command being sent via the RFID communication interface 10 to the RFID electronic tag ET1. In response to the command, the RFID electronic tag ET1 sends its control data CD. The control data CD received via the RFID communication interface are read in parallel by the first processing means 12 and the second processing means 13. The first processing means 12 and the second processing means 13 can check, in parallel, the integrity of the control data received and check, in parallel, whether these received control data CD do indeed correspond to the control data CD stored in their storage means 120, 130. The first processing means 12 and the second processing means 13 then exchange concerning the result of their check via the communication channel 15.

If the control data CD analysed by the first processing means 12 or by the second processing means 13 do not correspond to the stored control data, the read/write station 1 generates the two output signals S12, S13, meaning that the machine M must be kept stopped.

If the control data CD analysed by each of the two processing means 12, 13 do indeed correspond to the stored control data CD, the read/write station 1 generates the two output signals S12, S13, meaning that the machine M is allowed to start.

3) third case of operation: machine in operation and access means A closed.

In this case, since the RFID electronic tag ET1 has already been selected and activated, the read/write station 1 then reads only the control data CD of the RFID electronic tag ET1. The checking of the control data CD is carried out as described above for the second case of operation. If the control data CD read correspond to the control data CD stored by the first processing means 12 and by the second processing means 13, the read/write station 1 generates the output signals S12, S13 representative of the access means A closed state and meaning that the machine M can continue to operate. If the control data read do not conform to those stored or if the first processing means 12 and the second processing means 13 have not read the same control data CD, the read/write station 1 generates the output signals S12, S13 meaning that the machine must be stopped.

The solution of the invention therefore offers a number of advantages, which are listed below:

insensitivity to the introduction of another RFID electronic tag into the field of the station, the RFID electronic tag of the system being previously learned about during the system configuration phase, the communication protocol targeting only the activated tag, speed of detection because only the control data CD are read when the machine M is in operation and no collision-prevention mechanism is necessary, low cost and low bulk by virtue of the use of a single RFID electronic tag, ease of implementation because a single RFID electronic tag has to be installed and a single coupling has to be set up between the read/write station 1 and the RFID electronic tag ET1, reliable operation because the use of a single RFID communication interface 10 makes it possible to avoid the risks of interference and the problems of synchronism.

The invention claimed is:

1. Secure detection method implemented in a secure detection system intended to detect the presence of an RFID electronic tag, said system comprising a read/write station, said read/write station comprising an RFID communication interface intended to exchange data with the RFID electronic tag, first processing means connected to the RFID communication interface and second processing means connected to the RFID communication interface, said method comprising a step of storage, by the first processing means and by the second processing means, of a unique identifier of the RFID electronic tag and of control data associated with this unique identifier, a writing step controlled by the first processing means for writing the control data in the RFID electronic tag, a reading step implemented in parallel by the first processing means and by the second processing means for reading the control data sent by the RFID electronic tag when the RFID electronic tag is located within the field of the read/write station, a checking step implemented by the first processing means and the second processing means for performing a check on the control data read against the control data stored during the storage step, a step of generation, by the first processing means and by the second processing means, of two output signals taking into account the check performed during the checking step.

2. Method according to claim 1, wherein a step of selection and of activation of the RFID electronic tag is implemented by the reading and checking made by the first processing means and the second processing means, of the unique identifier stored in the RFID electronic tag.

3. System for the secure detection of an RFID electronic tag storing a unique identifier, comprising a read/write station, wherein said read/write station comprising:

an RFID communication interface intended to exchange data with the RFID electronic tag, first processing means connected to the RFID communication interface and comprising means for storing the unique identifier and control data associated with this unique identifier, means for writing control data in the RFID electronic tag and reading means for reading the control data stored in the electronic tag, second processing means connected to the communication interface and comprising means for storing the unique identifier and control data, and reading means for reading the control data stored in the RFID electronic tag, the first processing means and the second processing means comprising means for checking the control data read in the RFID electronic tag against the control data stored in the storage means, means for generating output signals activated by the first processing means and by the second processing means on the basis of the check performed by the checking means.

4. System according to claim 3, wherein the first processing means and the second processing means comprise means for reading and checking the unique identifier of the RFID electronic tag.

5. System according to claim 3, wherein the RFID communication interface comprises an antenna.

6. System according to claim 3, wherein a serial bus is installed between the RFID communication interface, the first processing means and the second processing means.

7. System according to claim 3, wherein a parallel bus is installed between the RFID communication interface, the first processing means and the second processing means.

8. System according to claim 3, wherein a communication channel is installed between the first processing means and the second processing means.

9. Detection system according to claim 3, wherein the RFID electronic tag is fixed to an access means to a hazardous area and in that the read/write station is fixed to the frame of the access means.

* * * * *